(12) United States Patent
Gueugneau et al.

(10) Patent No.: US 11,247,366 B2
(45) Date of Patent: Feb. 15, 2022

(54) MOLDING ELEMENT FOR MANUFACTURING A NOISE REDUCING TREAD

(71) Applicant: Compagnie Generale Des Etablissements Michelin, Clermont-Ferrand (FR)

(72) Inventors: Anthony Gueugneau, Tokyo (JP); Khotchakorn Pengsaloong, Tokyo (JP)

(73) Assignee: COMPAGNIE GENERALE DES ETABLISSEMENTS MICHELIN, Clermont-Ferrand (FR)

(*) Notice: Subject to any disclaimer, the term of this patent is extended or adjusted under 35 U.S.C. 154(b) by 622 days.

(21) Appl. No.: 16/304,967

(22) PCT Filed: May 31, 2016

(86) PCT No.: PCT/JP2016/066708
§ 371 (c)(1),
(2) Date: Nov. 27, 2018

(87) PCT Pub. No.: WO2017/208466
PCT Pub. Date: Dec. 7, 2017

(65) Prior Publication Data
US 2020/0324440 A1    Oct. 15, 2020

(51) Int. Cl.
*B29C 33/30*    (2006.01)
*B29D 30/06*    (2006.01)
(Continued)

(52) U.S. Cl.
CPC ........ *B29C 33/302* (2013.01); *B29D 30/0606* (2013.01); *B60C 11/042* (2013.01);
(Continued)

(58) Field of Classification Search
CPC ............ B29D 30/0606; B29D 30/0609; B60C 11/042; B60C 2011/0355;
(Continued)

(56) References Cited

U.S. PATENT DOCUMENTS

| 2012/0114777 A1* | 5/2012 | Villeneuve | ......... B29D 30/0606 425/46 |
| 2014/0328960 A1* | 11/2014 | Villeneuve | ......... B29D 30/0606 425/28.1 |
| 2015/0004269 A1* | 1/2015 | Roty | .................. B29D 30/0606 425/28.1 |

FOREIGN PATENT DOCUMENTS

| DE | 4403662 A1 | 8/1995 |
| EP | 0908330 A1 | 4/1999 |

(Continued)

OTHER PUBLICATIONS

Int'l Search Report for PCT/JP2017/020180, dated Aug. 17, 2017.
Int'l Search Report for PCT/JP2016/066708, dated Aug. 30, 2016.

*Primary Examiner* — Kelly M Gambetta
*Assistant Examiner* — Virak Nguon
(74) *Attorney, Agent, or Firm* — Dickinson Wright PLLC; Steven Hurles

(57) ABSTRACT

The molding element has a molding surface for forming a contact face of the contacting elements and a groove forming rib portion for forming the groove. The groove forming rib portion has opposed rib side faces for forming opposed groove side faces and a rib top face connecting the rib side faces for forming a groove bottom. The groove forming rib portion provides at least one space opening to at least one of the rib side faces and/or to the rib top face and an insert is received in the space. The insert is composed of a plurality of thin plates stacked in a direction along which the rib extends and comprises at least one notched plate of thickness t1 including at least one notch for forming a flexible (Continued)

fence of the closing device; and comprises at least one support plate of thickness t2 without notch.

8 Claims, 4 Drawing Sheets

(51) Int. Cl.
  *B60C 11/04* (2006.01)
  *B60C 11/03* (2006.01)
  *B60C 11/13* (2006.01)
(52) U.S. Cl.
  CPC ............... *B29D 2030/0612* (2013.01); *B60C 2011/0353* (2013.01); *B60C 2011/0355* (2013.01); *B60C 2011/1338* (2013.01); *B60C 2011/1361* (2013.01)

(58) Field of Classification Search
  CPC ..... B60C 2011/1338; B60C 2011/1361; B29C 33/302
  See application file for complete search history.

(56) References Cited

FOREIGN PATENT DOCUMENTS

| | | |
|---|---|---|
| JP | 60-121103 A | 6/1985 |
| JP | H03-276802 A | 12/1991 |
| JP | 2010-052699 A | 3/2010 |
| JP | 2012-071802 A | 4/2012 |
| JP | 2012-116339 A | 6/2012 |
| WO | 2013120783 A1 | 8/2013 |
| WO | 2013178473 A1 | 12/2013 |
| WO | 2016-092095 A1 | 6/2016 |
| WO | 2017-110663 A1 | 6/2017 |

\* cited by examiner

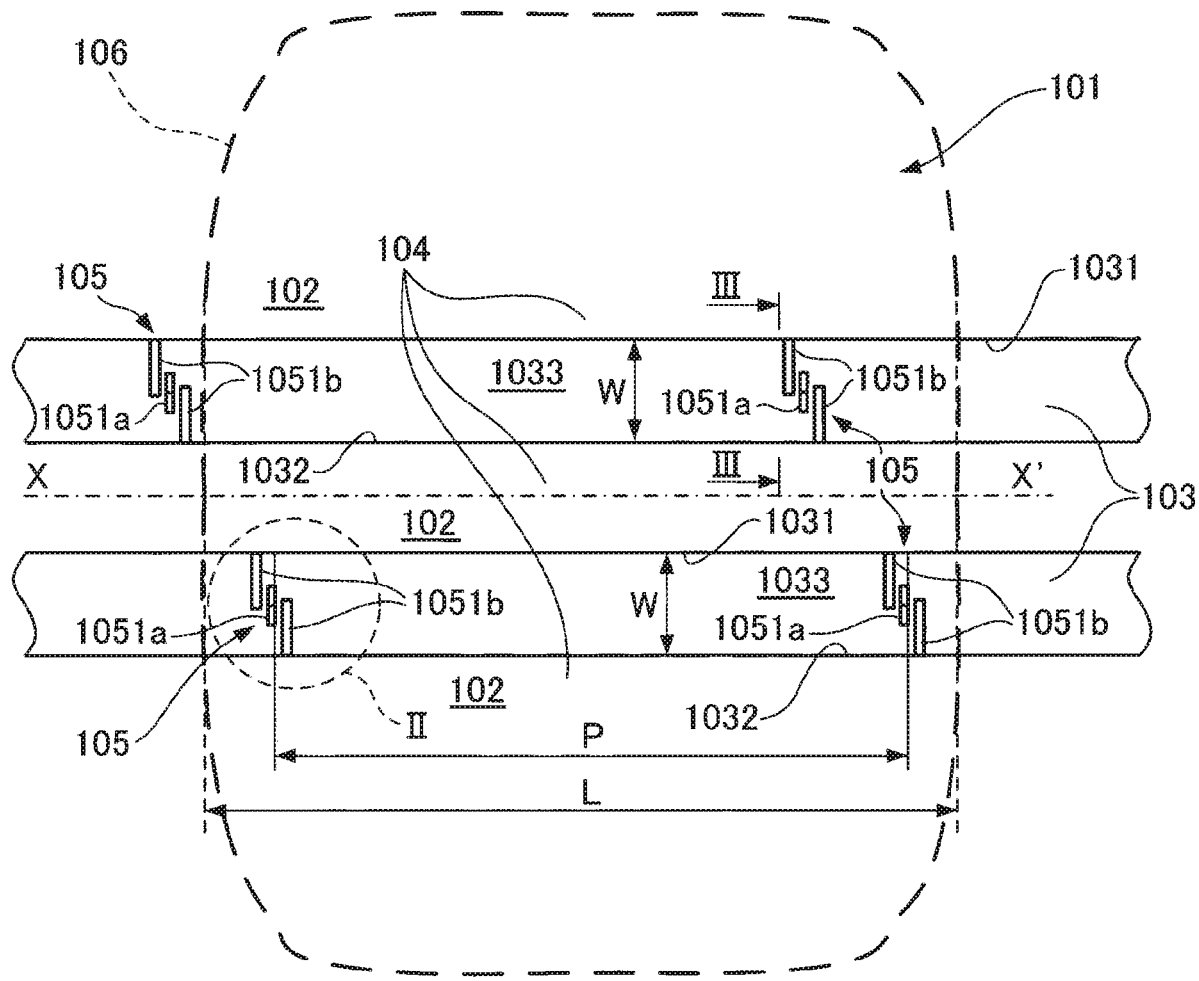

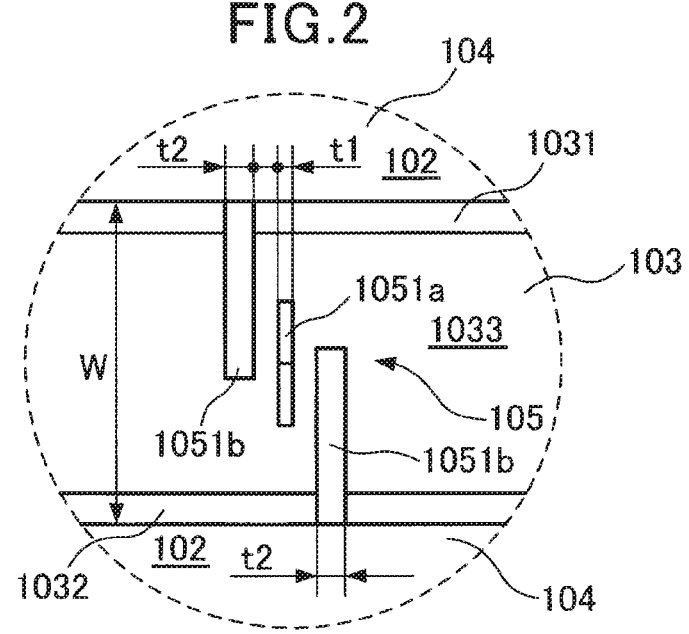
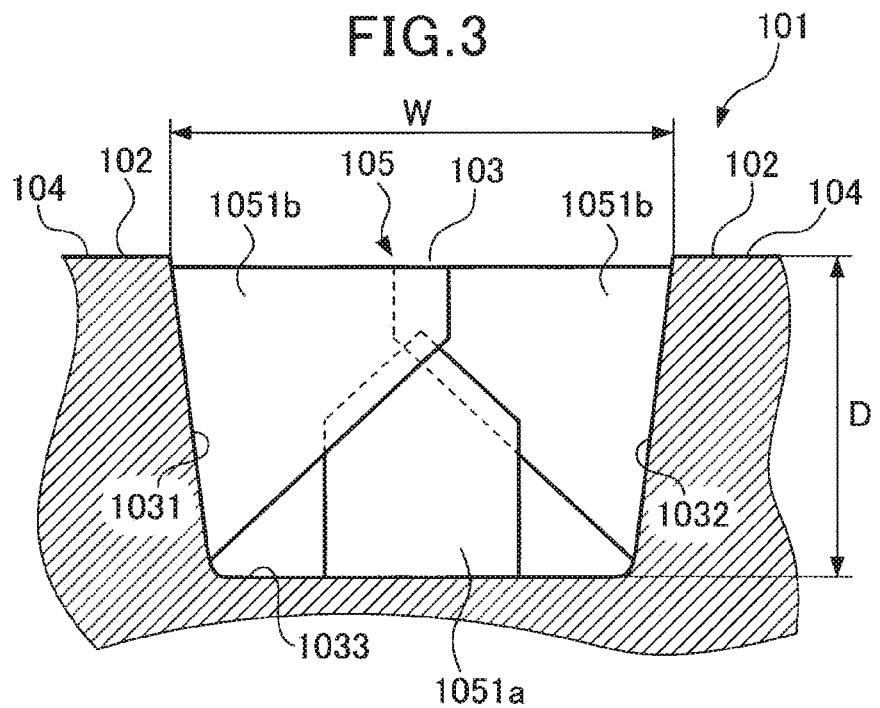

MOLDING ELEMENT FOR MANUFACTURING A NOISE REDUCING TREAD

CROSS-REFERENCE TO RELATED APPLICATIONS

The present application claims priority to PCT International Patent Application Serial No. PCT/JP2016/0667708, filed May 31, 2016, entitled "MOLDING ELEMENT FOR MANUFACTURING A NOISE REDUCING TREAD".

BACKGROUND OF THE INVENTION

1. Field of the Invention

The present disclosure relates to a molding element, in particular to a molding element for a mold used for manufacturing a tread for a tire having a closing device in a groove.

2. Related Art

A groove resonance is generated by occurrence of resonance in an air column defined between a groove in a tread and a road surface in contact with the tire. The frequency of this groove resonance is dependent on a length of the air column formed between groove and the road surface in the contact patch.

This groove resonance has a consequence in an interior noise and an exterior noise on a vehicle equipping such tires, a frequency of which interior and exterior noise is often at around 1 kHz where human ear is sensitive.

In order to reduce such groove resonance, it is known to provide a plurality of closing device in the form of a thin flexible fence made of rubber-based material in each groove. It is effective that each flexible fence covers all or at least major part of the sectional area in the groove. Each flexible fence can extend from a groove bottom, or from at least one of a groove sidewall delimiting such groove. Because being relatively thin, each flexible fence has to bend for opening the groove section to flow water on the road surface, in particular on the wet road.

Thanks to such flexible fences, the length of the air column is reduced so as to be shorter than the total length of groove in a contact patch, which leads to change the frequency of groove resonance. This change of resonance frequency makes the sound generated by the groove resonance less sensitive to human ear.

For preserving function of drainage, in case of driving in rainy weather, it is necessary for such flexible fence to bend in a suitable way under the action of the pressure of water for opening the section of the groove. Several solutions have been proposed using this type of closing device to reduce groove resonance of the groove.

WO2013/178473A1 discloses, in FIG. 4, a method for manufacturing a tread for a tire provided with at least one flexible wall (closing device) in a groove, the method comprising steps of molding the tread with a groove and at least one connecting element arranged inside the groove transversely so as to connect sidewalls of the groove, and cutting the connecting element at the junction with each the sidewall of the groove. However with such method productivity of such tread is low, as the method requires additional process of cutting the connecting element after molding.

WO2013/120783A1 discloses, in FIG. 3, a mold for molding a tread for a tire provided with at least one closing device, the mold comprising two cavities for the flexible fence separated by a first element.

The mold having the above cavities for the flexible fence has been manufactured through milling and/or casting process.

However, since milling and casting processes are complicated, the productivity of such molding element is low. Therefore, there is a need to improve productivity of the molding element for molding the tread provided with the flexible fence of the closing device.

In addition, since it is difficult to form cavities with precise dimension through milling and/or casting process, it has been difficult to obtain a tread having a flexible fence with precise thickness so to obtain required bending by hydrodynamic pressure for liquid drainage.

Therefore, there is a need for a molding element which can mold a flexible fence with precise thickness such that the molded flexible fence can appropriately bend by hydrodynamic pressure for liquid drainage.

Definitions

A "tire" means all types of elastic tire whether or not subjected to an internal pressure.

A "tread" of a tire means a quantity of rubber material bounded by lateral surfaces and by two main surfaces one of which is intended to come into contact with ground when the tire is rolling.

A "mold" means a collection of separate molding elements which, when brought closer towards one another, delimit a toroidal molding space.

A "molding element" of a mold means part of a mold. A molding element is, for example, a mold segment.

A "molding surface" of a molding element means a surface of the mold that is intended to mold a surface of the tread.

A "groove" is a space between two rubber faces/sidewalls which do not contact between themselves under usual rolling condition connected by another rubber face/bottom. A groove has a width and a depth.

SUMMARY OF THE INVENTION

It is thus an object of the disclosure to provide a molding element for a mold used for manufacturing a tread of a tire, such molding element can improve productivity for manufacturing a tread provided with a closing device in a groove while ensuring having precise thickness of the flexible fence of the closing device.

The present disclosure provide a molding element for a mold used for manufacturing a tread of a tire having a plurality of contacting element delimited by a plurality of groove, the molding element having a molding surface for forming a contact face of the contacting elements intended to come into contact with ground during rolling and a groove forming rib portion for forming the groove comprising two opposed rib side faces for forming two opposed groove side faces and a rib top face connecting two rib side faces for forming a groove bottom, the groove forming rib portion providing at least one space opening to at least one of the rib side faces and/or to the rib top face and an insert being received in the space for forming a portion of the groove and a closing device in the groove, the insert is composed of a plurality of thin plates stacked in a direction along which the rib extends and comprises at least one notched plate of thickness t1, including at least one notch for forming a flexible fence of the closing device, and at least one support plate of thickness t2 without notch.

This arrangement improves productivity of a tread provided with a plurality of flexible fence of a closing device in a groove while ensuring to have precise thickness of the closing device.

Since the insert is composed of a plurality of thin plates stacked in a direction along which the rib extends, that is easier to form a shape necessary for forming a portion of the groove of the tread and the flexible fence of the closing device, processing duration for manufacturing such the insert decreases resulting improvement on productivity of the molding element for manufacturing a tread provided with the plurality of flexible fence of the closing device in the groove.

Since a thickness of the plurality of notched plates for flexible fence composing the insert have narrow tolerance in thickness than other processes, it is possible to form the plurality of flexible fence of the closing device with accurate thickness to permit a correct bending of the flexible fence of the closing device for liquid drainage.

Since the insert comprises at least one notched plate of thickness t1 including at least one notch for forming the flexible fence of the closing device and at least one support plate of thickness t2 without the notch, it is possible to increase degree of freedom to design and to position the flexible fence of the closing device.

In another preferred embodiment, the thickness t1 of the notched plate and the thickness t2 of the support plate are both at most equal to 2.0 mm.

If these thicknesses t1 of the notched plate and/or the thickness t2 of the support plate are more than 2.0 mm, the closing device molded by the molding element would be too thick to bend with hydrodynamic pressure for liquid drainage as these thicknesses will substantially be equal to the thickness of the flexible fence of the closing device. These thicknesses may be the same between t1 and t2, may be different between t1 and t2.

These thicknesses, the thickness t1 of the notched plate and the thickness t2 of the support plate are preferably at most equal to 0.8 mm, more preferably at most equal to 0.7 mm and still more preferably at least equal to 0.02 mm and at most equal to 0.6 mm.

In case plural notched plates are provided in one single insert, the thickness t1 of each the notched plate may vary. In case plural support plates are provided in one single insert, the thickness t2 of each the support plate may vary.

In another preferred embodiment, the insert comprises at least two notched plates, the notch of one of the notched plate opens to at least one of the rib side face and the notch of the other notched plate opens to the rib top face, the support plate is provided at least between two notched plates.

According to this arrangement, it is possible to manufacture the flexible fence of the closing device overlapping partly in sectional view of the groove for making a sound wave generated by groove resonance difficult to propagate between the flexible fences of the closing device with more precise distance between the flexible fences for effective attenuation of the groove resonance due to air column resonance of the groove.

In another preferred embodiment, the thickness of the notched plate having the notch opening to the rib top face is different in thickness from the notched plate having the notch opening to the rib side face.

According to this arrangement, performance compromise by the flexible fences can be achieved. By making the thickness of the notched plate having the notch opening to the rib top face thicker than the thickness of the notched plate having the notch opening to the rib side face, it is possible to have a regular wear of the flexible fence extending from the groove bottom (formed via the notched plate having the notch opening to the rib top face) with tread wear by increased bending rigidity of the flexible fence extending from the groove bottom relative to the flexible fence extending from the groove sidewall (formed via the notched plate having the notch opening to the rib side face). Contrarily by making the thickness of the notched plate having the notch opening to the rib top face thinner than the thickness of the notched plate having the notch opening to the rib side face, it is possible to have easier bending of the flexible fence extending from the groove bottom (formed via the notched plate having the notch opening to the rib top face) even with reduced groove depth which results further improvement on drainage capability.

In another preferred embodiment, the thickness of the notched plate having the notch opening to the rib top face is thinner than the thickness of the notched plate having the notch opening to the rib side face.

According to this arrangement, it is possible to achieve easier bending of the flexible fence extending from the groove bottom (formed via the notched plate having the notch opening to the rib top face) even with reduced groove depth which results further improvement on drainage capability.

In another preferred embodiment, the insert comprises three notched plates, the notch of two notched plates each open to two opposite rib side faces and the other notch of the notched plate opens to the rib top face, the support plate is provided at least between each the notched plates.

According to this arrangement, it is possible to manufacture the flexible fences of the closing device effectively covering as broader cross sectional area of the groove as possible, while maintaining good productivity of the tread with the flexible fences, as the sectional area covered by each flexible fence can be reduced, resulting in higher flexibility of an arrangement of the flexible fences.

In another preferred embodiment, the insert comprises at least two support plates, and the support plate in the same insert having at least two different thicknesses t2.

According to this arrangement, it is possible to increase manufacturing efficiency and flexibility of the molding element. By using the support plate having at least two different thickness t2 between each the notched plates, it is possible to increase degree of freedom of an arrangement of the flexible fences in the closing device. By using the support plate having at least two different thickness t2 at a position between the notched plates and at the other position between the notched plate and a face of the space, a thickness of the insert can adjust easily for compensating a thickness of the space while ensuring precise thickness of the flexible fence of the closing device.

In another preferred embodiment, two ends of the insert in a direction along which the groove forming rib portion extends are the support plates.

According to this arrangement, it is possible to adjust easily the thickness of the insert for compensating the thickness of the space while ensuring precise thickness of the flexible fence of the closing device.

BRIEF DESCRIPTION OF THE DRAWINGS

Other characteristics and advantages of the disclosure arise from the description made hereafter in reference to the annexed drawings which show, as nonrestrictive examples, the embodiments of the invention.

In these drawings:

FIG. 1 is a schematic plan view of a tread for a tire molded with a mold comprising a molding element according to an embodiment of the present disclosure;

FIG. 2 is an enlarged schematic plan view showing a portion indicated as II in FIG. 1;

FIG. 3 is a schematic cross sectional view taken along line in FIG. 1;

DETAILED DESCRIPTION OF THE INVENTION

Figure 4:
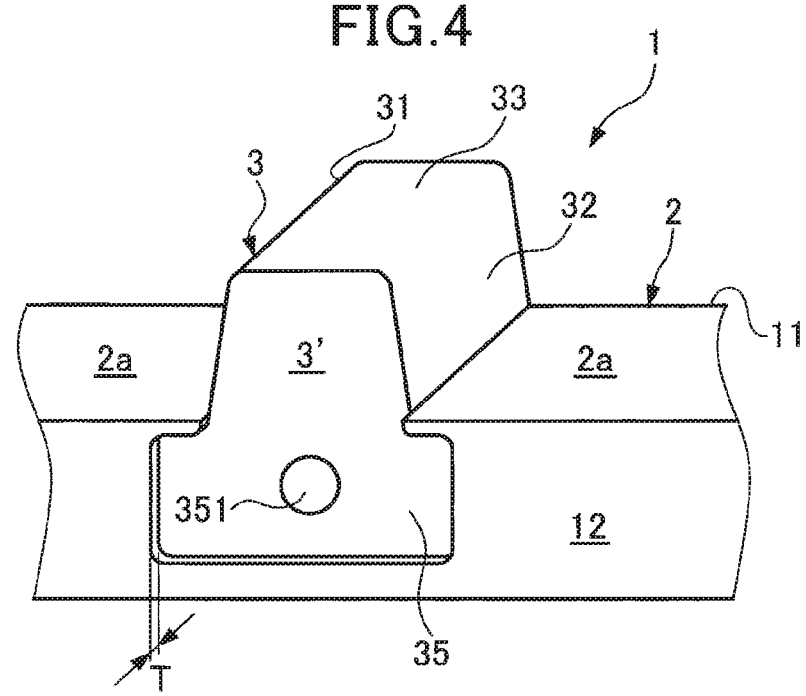
FIG. 4 is a schematic perspective view of a portion of the molding element without an insert according to embodiment of the present disclosure.

Preferred embodiments of the present disclosure will be described below referring to the drawings.

A molding element 1 for a mold used for manufacturing a tread 101 of a tire, a mold comprising the molding element 1, and a tread 101 molded and vulcanized using the mold according to an embodiment of the present disclosure will be described referring to FIGS. 1 to 6.

Figure 5:
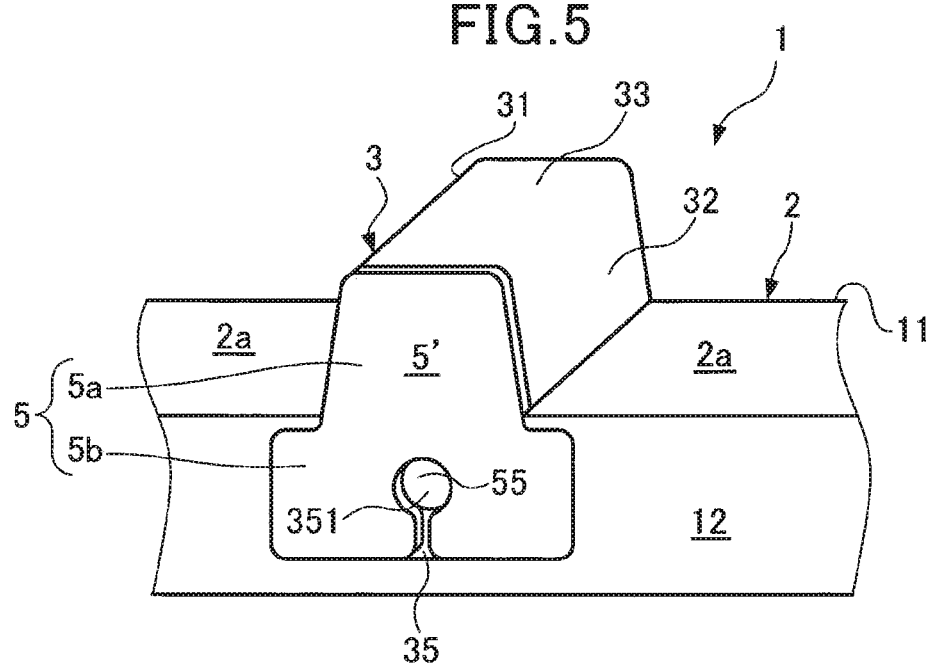
FIG. 5 is a schematic perspective view of a portion of the molding element with the insert according to embodiment of the present disclosure.
Figure 6:
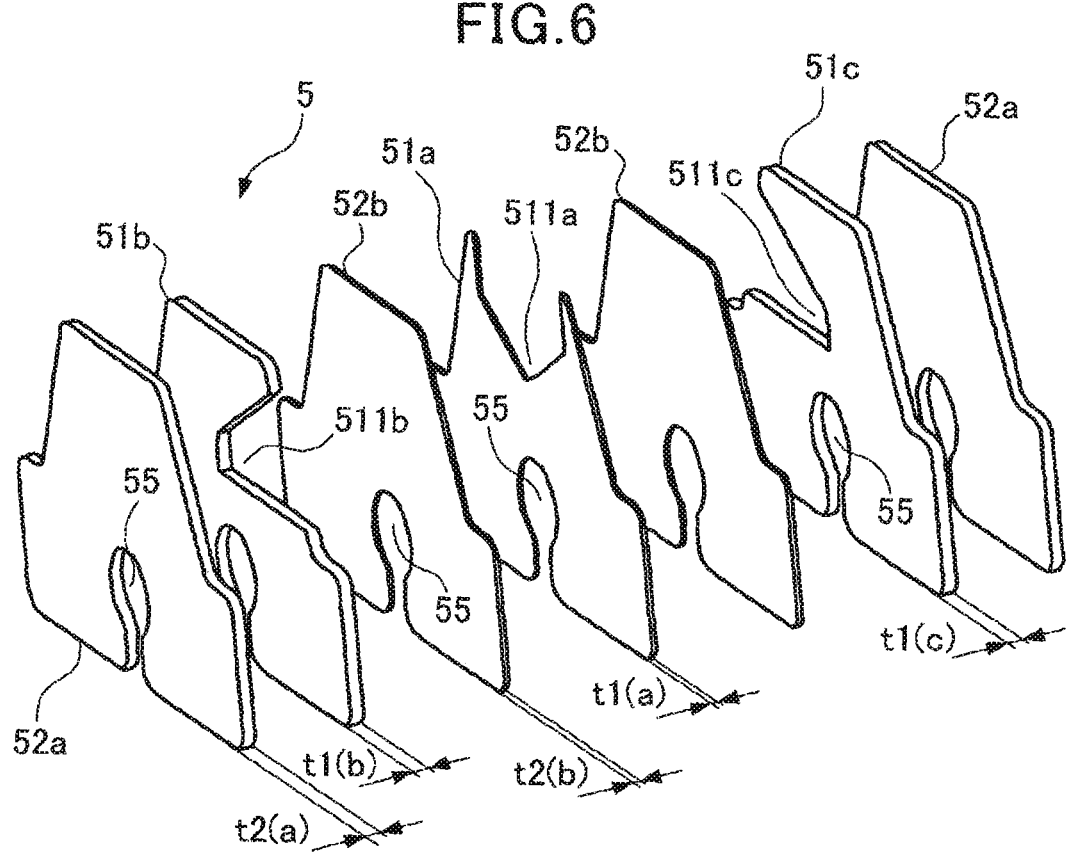
FIG. 6 is a schematic exploded perspective view of the insert according to embodiment of the present disclosure.

FIG. 1 is a schematic plan view of a tread for a tire molded with a mold comprising a molding element according to embodiment of the present disclosure. FIG. 2 is an enlarged schematic plan view showing a portion indicated as II in FIG. 1. FIG. 3 is a schematic cross sectional view taken along line in FIG. 1. FIG. 4 is a schematic perspective view of a portion of the molding element without an insert according to embodiment of the present disclosure. FIG. 5 is a schematic perspective view of a portion of the molding element with the insert according to embodiment of the present disclosure. FIG. 6 is a schematic exploded perspective view of the insert used in the first embodiment of the present disclosure.

The tread 101 is a tread for a tire having dimension 205/55R16 and comprises a contact face 102 intended to come into contact with the ground during rolling, a plurality of groove 103 extending in a tire circumferential direction indicated as XX'. The groove 103 is delimited by two groove sidewalls 1031, 1032 facing each other and being connected by a groove bottom 1033. The groove 103 has a width W at a level of the contact face 102 and a depth D (as shown in FIG. 3).

As shown in FIG. 1, a contact patch 106 has a contact patch length L in a tire circumferential direction when the tire with the tread 101 is mounted onto its standard rim and inflated at its nominal pressure and its nominal load is applied. According to 'ETRTO Standard Manual 2016' the standard rim for this size is 6.5 J, the nominal pressure is 250 kPa and the nominal load is 615 kg.

As shown in FIG. 1, in the groove 103, a plurality of closing device 105 is provided. The closing device 105 comprises one first flexible fence 1051a and two second flexible fences 1051b for dividing an air column created between the ground and the groove 103 in the contact patch 106 during rolling. Closing devices 105 are provided at a regular interval of distance P in the tire circumferential direction in the groove 103. The distance P is preferably shorter than the contact patch length L as to at least one closing device 105 in each groove 103 is always located in the contact patch 106 during rolling.

The first flexible fence 1051a has a thickness of t1(a) and extends from the groove bottom 1033 of the groove 103. Two second flexible fences 1051b have a thickness of t1(b) and extend from each of the opposite groove sidewalls 1031, 1032. Two second flexible fences 1051b in the same closing device 105 are offset each other in a circumferential direction in the groove 103. The first flexible fence 1051a is placed at a position circumferentially between two second flexible fences 1051b, 1051b and distant in circumferential direction (a direction along which the groove 103 extends) in the groove 103, as shown in FIG. 2.

The thickness t1(a) of the first flexible fence 1051a is thinner than the thickness t1(b) of the second flexible fence 1051b, as shown in FIG. 2. The first and the second flexible fences 1051a, 1051b partly overlap in a circumferential direction (in sectional view of the groove 103), and the two second flexible fences 1051b, 1051b also overlap partly in a circumferential direction (in sectional view of the groove 103). The first and the second flexible fences 1051a, 1051 b cover at least equal to 70% of the cross sectional area of the groove 103, as shown in FIG. 3.

As shown in FIG. 3, the first flexible fence 1051a has a pentagon shape extending from the groove bottom 1033 toward radially outward direction of the tread 101. The width of the first flexible fence 1051a is less than the width of the groove bottom 1033 at its bottom and the height of the first flexible fence 1051a is less than the depth D of the groove 103

Further, a radially inward edge of the second flexible fence 1051b extends obliquely upwardly from the groove sidewall 1031, 1032 so as to form a triangular space thereunder with the groove bottom 1033. A radially outward portion of the second flexible fence 1051b extends substantially parallel to the contact face 102. A radially outer edge of the second flexible fence 1051b extends substantially parallel to the contact face 102. The axial length (width) of the second flexible fence 1051b is less than the width W of the groove 103.

The tread 101 has the same structure as the conventional tread except for an arrangement regarding the closing device 105 and is intended to be applied to a conventional pneumatic radial tire and other non-pneumatic tire. Thus, description of the internal construction of the tread 101 will be omitted.

The groove 103 is provided with the plurality of closing device 105 each covering at least equal to 70% of the radial cross sectional area of the groove 103. Therefore, the length of the air column formed by the groove 103 in the contact patch 106 is shifted to a length whose groove resonance peak is outside of the frequency audible range for the human ear. Thus, groove resonance due to air column resonance of the groove 103 can be harmless.

The flexible fences of the closing device 105 are provided so as to be distant each other with the offset in a direction along which the groove 103 extends. Therefore, it is possible to effectively improve groove resonance due to air column as a sound wave generated by groove resonance has difficulty to propagate between each the flexible fences of the closing device 105.

The closing device 105 includes one first flexible fence 1051a and two second flexible fences 1051b and each of the second flexible fences 1051b extends from each of opposite groove sidewalls 1031, 1032. Therefore, it is possible to effectively cover as broader cross sectional area of the groove 103 as possible by the closing device 105, while maintaining good productivity of the tread 101 with the flexible fences as closing device 105, as the sectional area covered by each flexible fence can be reduced, resulting in higher flexibility of an arrangement of the first and the second flexible fences 1051a, 1051b.

The first flexible fence 1051a and the second flexible fence 1051b of the closing device 105 overlap partly in a circumferential direction (in sectional view of the groove 103). Also, two second flexible fences 1051b of the closing device 105 overlap partly in a circumferential direction (in sectional view of the groove 103). Therefore, it is possible to further effectively attenuate groove resonance due to air column resonance of the groove 103, as the sound wave generated by groove resonance has more difficulty to propagate between each the flexible fences of the closing device 105.

The thickness t1(a) of the first flexible fence 1051a is thinner than the thickness t1(b) of the second flexible fence 1051b. It is possible to have easier bending of the first flexible fence 1051a even with reduced groove depth, which results further improvement on drainage capability.

The offset between the flexible fences 1051a, 1051b of the closing device 105 may be different for each locations, and the thickness t1(b) of the second flexible fence 1051b may have different thickness one another.

Next, a molding element 1 for a mold used for manufacturing the tread 101 will be described referring to FIGS. 4, 5 and 6.

As shown in FIG. 4, the molding element 1 has a base portion 2 having a molding surface 2a intended to mold the contact face 102 of the contacting element 104. The base portion 2 has two side faces 11, 12 facing to circumferentially opposed directions. These side surfaces 11, 12 define circumferential extremities of the molding element 1.

In use, one side face 11 or 12 of one molding element 1 is contacted to the other side face 12 or 11 of the adjacent molding elements to form a mold.

As shown in FIG. 4, the molding element 1 also has a groove forming rib portion 3. The groove forming rib portion 3 has a trapezoid cross section and radially integrally extends from the molding surface 2a of the base portion 2 in a radially inward direction of the molding element 1.

The groove forming rib portion 3 includes two opposed rib side faces 31, 32 intended to mold two opposed groove side faces 1031, 1032, and a rib top face 33 intended to mold a bottom of the groove 1033. In case plurality of groove forming rib portions 3 is provided in one molding element 1, a radial position of the rib top face 33 can be the same among the these groove forming rib portions 3, or can be different among the these groove forming rib portions 3.

The circumferential length of the groove forming rib portion 3 is shorter than that of the base portion 2 by length T. As shown in FIG. 4, a circumferential end surface 3' of the groove forming rib portion 3 is placed at a position backwardly from the side face 12 of the base portion 2 by length T. Further, a rectangular area in the side face 12 below (or radially outwardly of) the groove forming rib portion 3 is backwardly offset from the side face 12 of the base portion 2 by length T so as to form a space 35, specifically a rectangular recessed space 35 having depth T.

The molding element 1 also comprises an insert 5 including an upper portion 5a having a trapezoid cross section identical to that of the groove forming rib portion 3 and a lower portion 5b having a rectangular cross section identical to that of the rectangular recessed space 35, as shown in FIG. 5.

The insert 5 is fixedly secured to the base portion 2 and the groove forming rib portion 3 such that the upper portion 5a abuts against the circumferential end surface 3' of the groove forming rib portion 3 and the lower portion 5b is received in the rectangular recessed space 35, as shown in FIG. 5.

Thickness of the insert 5 is the same as the above offset length T of the circumferential end surface 3' of the groove forming rib portion 3 and the depth T of the rectangular recessed space 35. Therefore, the surface 5' of the insert 5 is flush with the side face 12 of the base portion 2.

The insert 5 is fixed to the groove forming rib portion 3 by a fixing means such as a screw extending through a hole 351 in a groove forming rib portion 3 and a hole 55 in the insert 5.

The insert 5 may be fixed to the groove forming rib portion 3 by other manner such as welding, gluing, etc. In this case, the holes 55, 351 may not be provided.

The insert 5 can be placed at any part of the groove forming rib portion 3. In case, a space for receiving the insert 5 is provided at a position which is not facing to the side face 11, 12 of the molding element 1, the insert 5 can be placed so as to be disclosed in WO2010/146180A1, for example.

As shown in FIG. 6, the insert 5 is composed of a plurality of thin plates stacked in a direction along which the groove forming rib portion 3 extends. The insert 5 comprises at least one notched plate of thickness t1 which includes at least one notch for forming a flexible fence 1051 of the closing device 105, and at least one support plate of thickness t2 without the notch. In the present embodiment, the insert 5 comprises three notched plates 51a, 51b, 51c of thickness t1 and four support plates 52 of thickness t2.

Each of the notched plate 51a, 51b, 51c is provided so as to be sandwiched by two support plates 52. Two support plates 52a provided at extremities of the insert 5 have thickness t2(a) which is different from other two support plates 52b of thickness t2(b) in the same insert 5. In the present embodiment, the thickness t2(a) is thicker than the thickness t2(b).

The first notched plate 51a sandwiched by two support plate 52b has thickness t1(a) and includes a top notch 511a having a pentagon shape complementary to the first flexible fence 1051a so as to be open toward radially inward direction (that is, open to the rib top face 33 of the groove forming rib portion 3).

Each of the second notched plates 51b, 51c sandwiched by the support plate 52b and the support plate 52a has thicknesses t1(b), t1(c), respectively, and includes a side notch 511b, 511c respectively having a trapezoid shape complementary to the second flexible fence 1051b so as to be open toward axial direction (that is, open to the rib side face 31 or 32).

The top notch 511a is used to form the first flexible fence 1051a of the closing device 105, and the two side notches 511b are both used to form the second flexible fence 1051b of the closing device 105.

In the present embodiment, the thickness t1(a) is thinner than both the thickness t1(b) and t1(c), and the thickness t1(b) and t1(c) are the same.

The thickness t1 of all the notched plates 51 and the thickness t2 of all the support plates 52 are both at most equal to 2.0 mm. These thicknesses, the thickness t1 of the notched plate 51 and the thickness t2 of the support plate 52, are preferably at most equal to 0.8 mm, more preferably at most equal to 0.7 mm and still more preferably at least equal to 0.02 mm and at most equal to 0.6 mm.

All the notched plates 51 and the support plates 52 are provided with a hole 55 for receiving fixing means, such as a screw. In case the insert can be fixed to the groove forming rib portion 3 via means not requiring to have such the hole, the notched plate 51 and the support plates 52 of the insert 5 may not include any portions for receiving the fixing means, such as holes 55.

Any material able to resist force applied during vulcanization, for example metal, resin, plastic or composite material, is usable for configuring both the notched plate 51 and the support plate 52.

All the notched plates 51 and the support plates 52 may be prepared, for example by cutting a steel sheet via a wire or a laser.

All the notched plates 51 and the support plates 52 may be covered completely or partly with a non-stick material for better and easier demolding. The non-stick material is, for example xylane.

Since the insert 5 is composed of a plurality of thin plates stacked in a direction the groove forming rib portion 3 extends that is easier to form a shape necessary for forming a portion of the groove of the tread 101 and the flexible fence 1051 of the closing device 105, processing duration for manufacturing such the insert decreases resulting improvement on productivity of the molding element 1 for forming the tread 101 provided with the plurality of flexible fence 1051 of the closing device 105 in the groove 103.

Since a thickness of the plurality of the plates in the insert 5 can be manufactured so as to be more accurate in thickness than other processes, it is possible to form the plurality of flexible fence 1051 of the closing device 105 with accurate thickness to permit a required bending of the flexible fence 1051 of the closing device 105 for liquid drainage.

Since the insert 5 comprises one notched plate 51*a* of thickness t1(*a*) including one notch 511 for forming the first flexible fence 1051*a* of the closing device 105 and two support plate 52 of thickness t2, without the notch, it is possible to increase degree of freedom to design and to position the flexible fence 1051 of the closing device 105.

Since the thickness t1 of the notched plate 51 and the thickness t2 of the support plate 52 are both at most equal to 2.0 mm, it is possible to ensure satisfactory bending capability of the flexible fence 1051 of the closing device 105 with hydrodynamic pressure for liquid drainage as these thicknesses will substantially be equal to the thickness of the flexible fence 1051 of the closing device 105. These thicknesses, the thickness t1 of the notched plate 51 and the thickness t2 of the support plate 52 are preferably at most equal to 0.8 mm, more preferably at most equal to 0.7 mm and still more preferably at least equal to 0.02 mm and at most equal to 0.6 mm.

Since the insert 5 comprises at least two notched plates 51, the notch 511 of one of the notched plate 51 opens to at least one of the rib side face 31, 32 and the notch 511 of the other notched plate 51 opens to the rib top face 33, the support plate 52 is provided at least between two notched plates 51, it is possible to mold the flexible fence 1051 of the closing device 105 overlapping partly in sectional view of the groove 103 for making a sound wave generated by groove resonance difficult to propagate between the flexible fences 1051 of the closing device 105 with more precise distance between the flexible fences 1051 for effective attenuation of the groove resonance due to air column resonance of the groove 103.

Since the thickness of the notched plate 51 having the notch 511 opening to the rib top face 33 is different from the thickness of the notched plate 51 having the notch 511 opening to the rib side face 31, 32, performance compromise by the flexible fences 1051 can be achieved. By making the thickness t1(*a*) of the notched plate 51*a* having the notch 511*a* opening to the rib top face 33 thicker than the thickness of the notched plate 51*b*, 51*c* having the notch 511*b*, 511*c* opening to the rib side face 31, 32, it is possible to have a regular wear of the flexible fence 1051 extending from the groove bottom 1033 (formed via the notched plate 51*a* having the notch 511*a* opening to the rib top face 33) with tread wear by increased bending rigidity of the flexible fence 1051 extending from the groove bottom 1033 relative to the flexible fence 1051 extending from the groove sidewall 1031, 1032 (formed via the notched plate 51*b*, 51*c* having the notch 511*b*, 511*c* opening to the rib side face 31, 32). Contrarily by making the thickness t1(*a*) of the notched plate 51*a* having the notch 511*a* opening to the rib top face 33 thinner than the thickness t1(*b*), t1(*c*) of the notched plate 51*b*, 51*c* having the notch 511 opening to the rib side face 31, 32, it is possible to have easier bending of the flexible fence 1051 extending from the groove bottom 1033 (formed via the notched plate 51 having the notch 511 opening to the rib top face 33) even with reduced groove depth which results further improvement on drainage capability.

The insert 5 comprises three notched plates 51*a*, 51*b*, 51*c*, and the notch 511*b*, 511*c* of two notched plates 51*b*, 51*c* each open to two opposite rib side faces 31, 32 and another notch 511*a* of the notched plate 51*a* opens to the rib top face 33, and the support plate 52*b* is provided at least between each the notched plates 51*a*, 51*b*, 51*c*. Therefore, it is possible to manufacture the flexible fences 1051 of the closing device 105 effectively covering as broader cross sectional area of the groove 103 as possible while maintaining good productivity of the tread 101 with the flexible fences 1051 as closing device 105, as the sectional area covered by each flexible fence 1051 can be reduced, resulting in higher flexibility of an arrangement of the flexible fences 1051.

Since the insert 5 comprises at least two support plates 52, and the support plate 52 in the same insert 5 having at least two different thicknesses t2, it is possible to increase manufacturing efficiency and flexibility of the molding element 1. By using the support plate 52 having at least two different thickness t2 between each the notched plates 51, it is possible to increase degree of freedom of an arrangement of the flexible fences 1051 in the closing device 105. By using the support plate 52 having at least two different thickness t2 at a position between the notched plates 51 and at the other position between the notched plate 51 and a face of the space, a thickness of the insert 5 can adjust easily for compensating a thickness of the space 35 while ensuring precise thickness of the flexible fence 1051 of the closing device 105.

Since two ends of the insert 5 in the direction groove forming rib portion 3 extends are the support plates 52*a*, it is possible to adjust easily the thickness of the insert 5 for compensating the thickness of the space 35 while ensuring precise thickness of the flexible fence 1051 of the closing device 105.

The disclosure is not limited to the examples described and represented and various modifications can be made there without leaving its framework.

REFERENCE NUMERALS 1 molding element
11, 12 side face
2 base portion 2a molding surface
3 groove forming rib portion
31, 32 rib side face
33 rib top face
35 rectangular recessed space
351 hole
5 insert
51 notched plate
511 notch
52 support plate
55 hole
101 tread
102 contact face
103 groove
1031, 1032 groove side face
1033 groove bottom
104 contacting element
105 closing device
1051 flexible fence
106 contact patch

What is claimed is:

1. A molding element for a mold used for manufacturing a tread of a tire having a plurality of contacting elements delimited by a plurality of grooves, the molding element having a molding surface for forming a contact face of the contacting elements intended to come into contact with ground during rolling and a groove forming rib portion for forming the groove comprising two opposed rib side faces for forming two opposed groove side faces and a rib top face connecting two rib side faces for forming a groove bottom, the groove forming rib portion providing at least one space opening to at least one of the rib side faces and/or to the rib top face and an insert being received in the space for forming a portion of the groove and a closing device in the groove, wherein the insert is composed of a plurality of thin plates stacked in a direction along which the groove forming rib portion extends and comprises at least one notched plate of thickness t1 including at least one notch that extends through a full thickness of the notched plate in the direction along which the groove forming rib portion extends for forming a flexible fence of the closing device, the flexible fence having approximately the thickness t1, and at least one support plate of thickness t2 without notch.

2. The molding element according to claim 1, wherein the thickness t1 of the notched plate and the thickness t2 of the support plate are both at most equal to 2.0 mm.

3. The molding element according to claim 1, wherein the insert comprises at least two notched plates, the notch of one of the notched plates opens to at least one of the rib side face and the notch of the other notched plate opens to the rib top face, the support plate is provided at least between two notched plates.

4. The molding element according to claim 3, wherein the thickness of the notched plate having the notch opening to the rib top face is different in thickness from the notched plate having the notch opening to the rib side face.

5. The molding element according to claim 4, wherein the thickness of the notched plate having the notch opening to the rib top face is thinner than the thickness of the notched plate having the notch opening to the rib side face.

6. The molding element according to claim 3, wherein the insert comprises three notched plates, the notch of two notched plates each open to two opposite rib side faces and the other notch of the notched plate opens to the rib top face, the support plate is provided at least between each the notched plates.

7. The molding element according to claim 1, wherein the insert comprises at least two support plates without notches, and wherein the support plates in the same insert having at least two different thicknesses t2.

8. The molding element according to claim 1, wherein two ends of the insert in a direction along which the groove forming rib portion extends are the at least one support plate.

* * * * *